US006533943B1

(12) United States Patent
Jones et al.

(10) Patent No.: US 6,533,943 B1
(45) Date of Patent: Mar. 18, 2003

(54) PROCESS FOR THE REMOVAL OF OXIDIZING AGENTS

(76) Inventors: Tony Jones, 57717 Araphahoe Rd., Boulder, CO (US) 80303; Richard Kraemer, 57717 Araphahoe Rd., Boulder, CO (US) 80303

(*) Notice: Subject to any disclaimer, the term of this patent is extended or adjusted under 35 U.S.C. 154(b) by 0 days.

(21) Appl. No.: 09/661,954

(22) Filed: Sep. 14, 2000

Related U.S. Application Data

(60) Provisional application No. 60/198,460, filed on Apr. 18, 2000.

(51) Int. Cl.⁷ .............................................. B01D 21/00
(52) U.S. Cl. ........................ 210/714; 270/716; 270/757; 270/903; 423/555
(58) Field of Search ............................... 423/235, 239.1, 423/395, 555, 566.3, 565, 351; 210/714, 716, 719, 757, 903

(56) References Cited

U.S. PATENT DOCUMENTS

| | | | | |
|---|---|---|---|---|
| 4,044,111 A | * | 8/1977 | Furuta et al. ............... | 423/351 |
| 4,329,224 A | * | 5/1982 | Kim ........................... | 210/709 |
| 4,348,299 A | * | 9/1982 | Okamoto et al. ...... | 252/301.4 S |
| 6,030,520 A | * | 2/2000 | Dziewinski et al. ........ | 205/771 |

* cited by examiner

*Primary Examiner*—Stanley S. Silverman
*Assistant Examiner*—Maribel Medina
(74) *Attorney, Agent, or Firm*—Webb & Louis LLC; Glenn L. Webb

(57) ABSTRACT

A synthesized compound that is able to neutralize oxidizing agents such as nitrates from water systems, from ground surfaces and other sites. When contaminated water is passed through the synthesized compounds or when the synthesized compounds are applied to contaminated surfaces (such as feedlots), the nitrates are reduced to elemental nitrogen gas and calcium sulfates. The harmless nitrogen gas is vented into the atmosphere while the insoluble sulfate compound is collected and available to use as a soil amendment or other uses.

12 Claims, No Drawings

PROCESS FOR THE REMOVAL OF OXIDIZING AGENTS

RELATED APPLICATIONS

This application corresponds to the subject matter of provisional patent application Ser. No. 60/198,460, filed on Apr. 18, 2000.

FIELD OF THE INVENTION

This invention relates to the field of removal of nitrates, halogens oxides, and other compounds from the environment, and particularly for the removal of nitrates from water systems. It also relates to the removal of unwanted and chemically reducible inorganic and organic substances from municipal, industrial and environmental settings.

BACKGROUND OF THE INVENTION

Presently, there is a serious concern with the contamination of the environment due to the increasing presence of nitrates ($NO_3^-$) and other compounds, including halogens, (e.g., chlorine, bromine) and other such compounds. Many of these compounds contaminate the ground water and air but are of particular concern in water systems. These compounds are increasingly posing serious health and environmental hazards to the ground water, rivers, streams, lakes, reservoirs and even the larger bodies of water. For instance, nitrates are found in ever increasing concentrations around the world from the application of fertilizers, pesticides, insecticides and other agrochemical uses, from waste byproducts in livestock operations, industrial facilities and from municipal and commercial waste treatment facilities. This nitrate contamination of water supplies is of major concern not only in the United States and other developed countries but in lesser-developed countries that do not have the level of water treatment that exist in the more developed locations. A number of local, state and federal government agencies have, or are in the process of creating allowable standards of nitrate levels in potable water. Further, concern has arisen for the preservation of fisheries and other aquatic wildlife due to nitrate and other chemical contamination.

Presently, there are realistically no economical and few effective mechanisms for the removal of these compounds from water systems. One category of nitrate removal mechanisms is ion exchange filtration systems. These systems remove all present anions and cations to produce substantially distilled water. An example of such a system uses an anion exchange resin in a chloride or bicarbonate cycle. In the chloride cycle, the resin is regenerated with sodium chloride or with bicarbonate. The exchanger removes all the sulphate together with the nitrate by replacing those ions with chloride or bicarbonate ions. The bicarbonate content of the water is then replaced in the floride cycle by chloride. The resulting product water is likely to be corrosive and not palatable. These systems, while effective, create additional problems, including the accumulation of collected nitrates that must be disposed of in some manner. U.S. Pat. No. 5,306,400 describes a typical ion exchange system for removing nitrates from water systems.

Denitrification is another well-known nitrate removal process. This process destroys nitrate with denitrifying bacteria in an anoxic process. A nutrient carbon source is added along with an electron donor, such as methanol. The oxygen dissolved in the water must be consumed along with a corresponding consumption of nutrient before denitrification can occur. Water produced by the anoxic process must then be reconditioned and the biomass removed from it. This process is difficult to control. Also, the cost and toxicity of the methanol used as the nutrient carbon source and electron donor is also a factor. Additionally this process is liable to produce concentrations of nitrite or other undesirable side products in the product water.

Another category of nitrate removal mechanism is the use of electrochemical processes. These electrochemical processes destroy nitrate ions by converting them into water, nitrogen and oxygen by oxidative and reductive processes. An example of these processes is described in U.S. Pat. No. 3,452,657. These systems are inefficient in terms of yield and in terms of usability and are expensive.

Finally there is the process of reverse osmosis (RO) that is widely used for desalination and removes all chemical salts, including the nitrate ion, by forcing water through a semi-permeable membrane. Capital costs are expensive.

Thus, presently there is a need for an inexpensive, efficient and effective system for removing nitrates and other harmful compounds from water systems and from other environmental locations.

SUMMARY OF THE INVENTION

The present invention solves these problems and others by providing inexpensive synthesized compounds in multiple forms that allow for many diverse applications. The basic compounds when used alone or impregnated into various matrices provide a highly flexible system for reducing unwanted and harmful oxidizing agents from a wide range of locales. For example, they are able to neutralize oxidizing agents such as nitrates from water systems, ozone from air systems and other substances from various venues. The present invention also provides processes for synthesizing these compounds and for their incorporation into various matrices. Additionally, the present invention provides systems for using these compounds for removing nitrates and other oxidizing agents from water systems, from contaminated ground surfaces, industrial locations and from other sites.

The active compounds of the present invention are referred to, for purposes of this application, as metasulfides. The metasulfide compounds, when used alone or impregnated into a matrix, form a critical feature of the present invention for the removal of nitrates and other contaminates from contaminated water and other locations. When contaminated water is passed through the metasulfides or when the metasulfides are applied to contaminated surfaces (such as feedlot ponds), the nitrates are reduced to elemental nitrogen gas and calcium sulfates. The harmless nitrogen gas is vented into the atmosphere while the insoluble calcium sulfate is collected and available to use as a soil amendment or other uses.

The synthesis of metasulfide takes advantage of the multiple molecular species that liquid sulfur displays. Crystalline sulfur is composed of rings of 8 sulfur atoms connected together. The rings themselves are arranged to form rhombic crystals. When sulfur is heated and brought to its melting point, the rings separate from each other but maintain their internal integrity. Upon further heating the rings open and become 8 member divalent chains. If heated further, the chains couple to each other forming 16, 24, 32, etc. member chains. Additional heat (just below the boiling point of sulfur) will cause the elongated chains to break up into small fragments. Calcium is added to liquid sulfur at a critical point to form the metasulfides. Selected matrices are then added to the liquefied mixture and allowed time to penetrate into the microstructure of the matrix.

Calcium metasulfide is a solid at room temperature with a melting point of approximately 120° C. The solid rock-like calcium metasulfide is crushed and sieved to produce various sized particles. When used alone, this granular product is then put into tanks or into pipes. Nitrate contaminated water is then passed through the product. The nitrogen gas formed is vented to the atmosphere. Calcium sulfate accumulates and remains within the tank or pipe for later collection.

Impregnating calcium metasulfide into various matrices such as carbon or perlite allows for expanded applications. For example, when impregnated into carbon, the resulting product can be formed into blocks or cartridges. The cartridges can then be placed into nitrate removal appliances for use in households and other settings. The blocks offer ease of conveyance over granules especially when exchanging out spent cartridges. When impregnated into perlite, the resulting product is light in weight and floats on water. This feature allows it to be placed in water permeable bags for easy use in agriculture and livestock applications. For example, the bagged perlite product can be easily dispersed on stock ponds containing livestock runoff. Other forms of impregnating calcium metasulfide are also contemplated, including perlite, carbon, charcoal, vermiculite, bentonite, diatomaceous earth, zeolite, cellulose, kaelite, talc, attapuglite and other netural materials and for many other uses.

The proportion of sulfur and calcium hydroxide can be varied to create metasulfides that have different properties, particularly the rate at which they react with the oxidizing agents such as nitrates and with the amount of oxidizing agents that can be neutralized. Thus, metasulfide compounds can be created for particular operations.

Metasulfides can be created as well under the present invention that will destroy, decompose, reduce and eliminate oxidizing agents. Some of the oxidizing agents that can be removed include ozone, nitrates, halogens oxides, and synthetically or naturally occurring oxidizing agents. Also removed are any chemically reducible inorganic or organic compounds that are unwanted in the environment, which they contaminate or occupy. For example, certain pesticides and herbicides in water, specific gases in air, and a multitude of chemically reducible and unwanted substance in industrial and manufacturing liquids and gases are removed.

Other metasulfides that can be synthesized under the present invention include combining sulfur with potassium carbonate to create potassium polysulfides. This product is water-soluble and therefore has some additional applications than calcium metasulfide. It to can be used to remove the above-described oxidizing agents.

These and other features will be evident from the ensuing detailed description of the preferred embodiments and from the claims.

DETAILED DESCRIPTION OF PREFERRED EMBODIMENTS

The preferred embodiments discussed herein are intended for explanatory purposes and are expressly not intended to unduly limit the scope of the claimed inventions.

A preferred embodiment of the present invention uses a process for synthesizing compounds for removing oxidizing agents such as nitrates, halogens oxides, and other compounds from environmental waters; from contaminated ground surfaces and from other environmental locations. These synthesized compounds are defined for purposes of this application as "metasulfides".

These compounds form a critical feature of the present invention for removal nitrates and other contaminates from contaminated water and ground locations. When contaminated water is passed through the metasulfides or when the metasulfides are applied to contaminated surfaces (such as feedlot ponds), the nitrates are reduced to elemental nitrogen gas and calcium sulfates. The harmless nitrogen gas is vented into the atmosphere while the insoluble calcium sulfate is collected and available to use as a soil amendment or other uses.

The synthesis of metasulfide takes advantage of the multiple molecular species displayed by liquid sulfur. Crystalline sulfur is composed of rings of 8 sulfur atoms connected together. The rings themselves are arranged to form rhombic crystals. When sulfur is heated and brought to its melting point, the rings separate but maintain their integrity. Upon further heating the rings open and become 8 member divalent chains. If heated further, the chains couple to each other forming 16, 24, 32, etc. member chains. Additional heat Oust below the boiling point of sulfur) will cause the elongated chains to break up into small fragments.

The metasulfides of the present invention are created by maintaining the temperature of the liquid sulfur just at the point where the chains are formed and below the temperature at which they couple to each other. At this point, calcium hydroxide is added to the melted sulfur. The divalent calcium ion bonds covalently to two of the divalent chains forming a molecule similar to this:

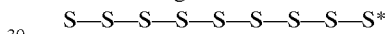
Ca*unpaired electron
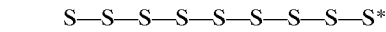
This is but one possible species. Other possibilities include:
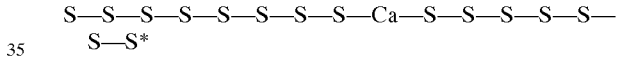
Ca
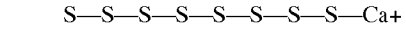

The length of the sulfur chains will vary depending on reaction conditions. Therefore, a 16-atom sulfur molecule is the dominant species, but other numbered sulfur atoms probably exist as well along with various amounts of calcium per sulfur atoms. (Hence the name metasulfide.) All species of calcium metasulfide are nitrate removal compounds, i.e., reducing agents.

Calcium metasulfide is a solid at room temperature with a melting point of approximately 120° C. The solid rock-like calcium metasulfide is crushed and sieved to produce various sized particles. This granular product is then put into tanks or into pipes. Nitrate contaminated water is then passed through the product. The nitrogen gas formed is vented to the atmosphere. Calcium sulfate accumulates and remains within the tank or pipe for latter collection.

The proportion of sulfur and calcium hydroxide can be varied to create metasulfides that have different properties, particularly the rate of the reaction with the oxidizing agents such as nitrates and with the amount of oxidizing agents that can be neutralized. Thus, metasulfide compounds can be created for particular operations.

The present invention will be further described with reference to the following non-limiting examples:

EXAMPLE 1

Twenty (20) parts of sulfur are exposed to ten (10) parts of calcium hydroxide in a closed system absent of air. Heat, up to 120° Celsius, is applied to the system for approximately sixty minutes. A short chain calcium polysulfide is formed comprising about sixty-six percent (66%) sulfur and about thirty-three percent (33%) calcium hydroxide. This metasulfide compound reacts to oxidizing agents, including nitrates (NO$_3^-$) within fifteen (15) seconds. About one gram of the dry metasulfide will neutralize about 1.2915 grams of nitrate. This mixture is particularly suitable for impregnation into a carbon or charcoal matrix. The reaction with the nitrate ion forms nitrogen gas that can be vented to the atmosphere and calcium sulfate that can be accumulated and removed for later collection.

EXAMPLE 2

Twenty (20) parts of sulfur are exposed to five (5) parts of calcium hydroxide in a closed system absent of air. Heat, up to 120° Celsius, is applied to the system for approximately sixty minutes. A short chain calcium polysulfide is formed comprising about eighty percent (80%) sulfur and about twenty percent (20%) calcium hydroxide. This metasulfide compound reacts to oxidizing agents, including nitrates (NO$_3^-$) within two hundred (200) seconds. About one gram of the dry metasulfide compound will neutralize about 1.550 grams of nitrates. The reaction will form nitrogen gas that can be vented to the atmosphere and calcium sulfate that can be accumulated and removed for later collection.

EXAMPLE 3

Twenty (20) parts of sulfur are exposed to four (4) parts of calcium hydroxide in a closed system absent of air. Heat, up to 120° Celsius, is applied to the system for approximately sixty minutes. A calcium polysulfide chain is formed comprising about eighty-three point three percent (83.3%) sulfur and about sixteen point seven percent (16.7%) calcium hydroxide. This metasulfide compound reacts to oxidizing agents, including nitrates (NO$_3^-$) within three hundred fifty (350) seconds. The reaction will form nitrogen gas that can be vented to the atmosphere and calcium sulfate that can be accumulated and removed for later collection.

EXAMPLE 4

Twenty (20) parts of sulfur are exposed to three (3) parts of calcium hydroxide in a closed system absent of air. Heat, up to 120° Celsius, is applied to the system for approximately sixty minutes. A calcium polysulfide chain is formed comprising about eighty-six point nine five six percent (86.956%) sulfur and about thirteen point zero four four percent (13.044%) calcium hydroxide. This metasulfide compound reacts to oxidizing agents, including nitrates (NO$_3^-$) within three hundred seventy-five (375) seconds. The reaction will form nitrogen gas that can be vented to the atmosphere and calcium sulfate that can be accumulated and removed for later collection.

EXAMPLE 5

Twenty (20) parts of sulfur are exposed to two (2) parts of calcium hydroxide in a closed system absent of air. Heat, up to 120° Celsius, is applied to the system for approximately sixty minutes. A chain calcium polysulfide is formed comprising about ninety point nine nine percent (90.99%) sulfur and about nine point nine nine one percent (9.991%) calcium hydroxide. This metasulfide compound reacts to oxidizing agents, including nitrates (NO$_3^-$) within four hundred fifty (450) seconds. The reaction will form nitrogen gas that can be vented to the atmosphere and calcium sulfate that can be accumulated and removed for later collection. This example forms a compound that is extremely water insoluble and very slow to react with the oxidizing agents such as nitrates.

Thus, this metasulfide may be applied directly onto contaminated ground surfaces, such as in feedlots, hog operations, and other surfaces where there is a concentration of nitrates or other oxidizing agents.

It is to be expressly understood that other proportions can be used as well to create metasulfides for neutralizing nitrates, and other oxidizing agents. The above examples are provided for explanatory purposes only.

The chemical process, of another preferred embodiment of the present invention occurs as follows:

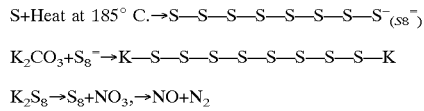

$$K_2CO_3 + S_8^- \rightarrow K-S-S-S-S-S-S-S-S-K$$

$$K_2S_8 \rightarrow S_8 + NO_3^- \rightarrow NO + N_2$$

This synthesized compound uses Potassium Carbonate instead of Calcium Hydroxide to form the metasulfide. In an example of this metasulfide, Sulfur and Potassium Carbonate are heated together at a temperature of about no more than 185 degrees Celsius until effervescence ceases. The heat is then increased until perfect fusion results. The mixture is cooled in the absence of air or moisture. This particular compound is useful for removing chlorine from environmental sites, such as swimming pools and other sites.

Other cations that form soluble or slowly soluble sulfates are potential metasulfide formers. They include, but are not restricted to, sodium, barium, iron, silver and lead. The anion species include, but are not restricted to, carbonate, oxide, hydroxide and chloride.

In a preferred embodiment of the present invention, the metasulfides impregnated into carbon and formed into cartridges may be placed in a filtration unit, such as underneath a sink, to enable tap water to be filtered for use. Other embodiments are scaled up versions to be used for building filtration, for commercial applications, for municipal treatments and for other uses as well. In the case of the dry granular products the granular size can be varied as needed for best results. The proportions of ingredients of the metasulfides can be varied as well to achieve the preferred results.

In other embodiments of the present invention, the metasulfides can be provided in an air filtration system to remove oxidizing agents such as ozone from the air. In this case the metasulfide is impregnated into a matrix suitable to perform as a filter in an air moving system.

In another preferred embodiment, the above-described metasulfide compounds can be presented either by themselves in powder or granular form, or combined in a matrix. Preferred matrixes for these compounds include carbon, charcoal, perlite, vermiculite, bentonite, diatomaceous earth, zeolite, cellulose, kaelite, talc, attapulgite clay, synthetic resins and ion exchange products and or other neutral and synthetic materials. These particles provide less resistance to flow for use in water systems, and have an increased surface area for increasing the contact time between the compounds and the water, ground or air to be cleaned.

These and other embodiments described herein are not meant to limit the scope of the claimed inventions. The claimed inventions include these embodiments and others as will be evident from persons skilled in the art.

We claim:

1. A method for removing nitrates from aqueous environmental systems, said method comprising the steps of:

synthesizing calcium or potassium sulfide compounds;

providing said calcium or potassium sulfide compounds in an environmental system; and passing water from the environmental system through said calcium or potassium sulfide compounds to reduce the nitrates to elemental nitrogen and calcium or potassium sulfate compounds.

2. The method of claim 1 wherein said step of synthesizing calcium sulfide compounds includes:

exposing sulfur to calcium hydroxide in a closed system and heating to about 120 degrees Celsius for about sixty minutes.

3. The method of claim 2 wherein said step of synthesizing calcium sulfide compounds includes:

using about 20 parts sulfur and 10 parts calcium hydroxide.

4. The method of claim 2 wherein said step of synthesizing calcium sulfide compounds includes:

using about 20 parts sulfur and 5 parts calcium hydroxide.

5. The method of claim 2 wherein said step of synthesizing calcium sulfide compounds includes:

using about 20 parts sulfur and 3 parts calcium hydroxide.

6. The method of claim 2 wherein said step of synthesizing calcium sulfide compounds includes:

using about 20 parts sulfur and 2 parts calcium hydroxide.

7. The method of claim 1 wherein said step of synthesizing potassium sulfide compounds includes:

exposing sulfur to potassium carbonate at a temperature of about 185 degrees Celsius until effervescence ceases.

8. The method of claim 1 wherein said environmental system includes:

water systems.

9. The method of claim 1 wherein said environmental system includes:

ground surface systems.

10. The method of claim 1 wherein said method further comprises the step of:

impregnating said calcium or potassium sulfide compounds into a matrix.

11. The method of claim 10 wherein said matrix includes one member selected from the group consisting of charcoal, carbon, zeolite, bentonite, perlite vermiculite, cellulose, diatomaceous earth, synthetic resins and natural and synthetic substances capable of being impregnated by calcium or potassium sulfides.

12. The method of claim 1 wherein said environmental system includes:

an industrial system.

* * * * *